United States Patent [19]
Chino

[11] Patent Number: 6,126,178
[45] Date of Patent: Oct. 3, 2000

[54] STRUCTURE FOR SUPPORTING RESISTANCE CYLINDERS

[75] Inventor: Kenji Chino, Kariya, Japan

[73] Assignee: Kabushiki Kaisha Toyoda Jidoshokki Seisakusho, Kariya, Japan

[21] Appl. No.: 09/105,850

[22] Filed: Jun. 26, 1998

[30] Foreign Application Priority Data

Jun. 27, 1997 [JP] Japan .................................... 9-171959

[51] Int. Cl.[7] ....................................................... B60P 1/16
[52] U.S. Cl. ........................................ 280/6.154; 280/754
[58] Field of Search ............................... 280/6.15, 6.153, 280/6.154, 755, 754

[56] References Cited

U.S. PATENT DOCUMENTS 4,129,310  12/1978  Nordmark ............................ 280/6.154
5,639,119   6/1997  Plate et al. ............................. 280/754

FOREIGN PATENT DOCUMENTS 58-183307  10/1983  Japan .

*Primary Examiner*—Paul N. Dickson
*Attorney, Agent, or Firm*—Woodcock Washburn Kurtz Mackiewicz & Norris LLP

[57] ABSTRACT

An industrial vehicle has a frame and an axle pivotally coupled with the frame by way of a pair of hydraulic cylinders. The cylinders each have a hollow body that defines a hydraulic chamber therein, a piston fitted in the chamber and a piston rod that has a distal end located outside the body to engage an upper surface of the axle. The chamber communicates with a hydraulic circuit to regulate the cylinders. The piston rod has at its end a follower contacting the upper surface of the axle.

15 Claims, 2 Drawing Sheets

6,126,178

STRUCTURE FOR SUPPORTING RESISTANCE CYLINDERS

BACKGROUND OF THE INVENTION

The present invention relates to a structure for supporting hydraulic resistance cylinders in industrial vehicles such as forklifts. More particularly, the present invention pertains to a structure for supporting resistance cylinders, which connect an axle to a vehicle body frame, such that the tilting axle with respect to the body frame is regulated by the resistance cylinders.

DESCRIPTION OF THE RELATED ART

A forklift has a body frame and axles that are coupled to the body frame. To provide driving stability and riding comfort, there are forklifts having an axle that is tiltable with respect to the body frame. However, in such forklifts, centrifugal force tilts the forklift when the forklift changes directions. Therefore, the tiltable axles hindered stable steering and made it difficult to increase speed when changing directions.

Japanese Unexamined Patent Publication No. 58-183307 describes a forklift that locks its tiltable axle if the centrifugal force produced when steering the forklift exceeds a predetermined value. The locking of the axle holds the axle in a fixed state and enables stable steering.

The axle is connected to the body frame by a hydraulic resistance cylinder. A hydraulic circuit is connected to the cylinder to selectively lock and unlock the cylinder. The cylinder has a piston rod connected to the body frame. When the cylinder is unlocked, the movement of hydraulic oil in the hydraulic circuit causes the piston rod to project from or retract into the cylinder. In this state, the cylinder permits tilting of the axle. To lock the cylinder, the oil is not permitted to exit the cylinder. This keeps the piston rod fixed at the same position. In this state, the cylinder locks the axle to the body frame.

The cylinder has an upper end that is pivotally connected to a body frame bracket by a pin. The cylinder also has a lower end that is connected to an axle bracket by a pin. However, it is difficult to connect the cylinder to the brackets using the pins.

Furthermore, the tolerable dimensional differences of the parts to which the cylinder is connected, such as the frame bracket and the axle bracket, may further make it difficult to connect the cylinder to the brackets.

In addition, the employment of the brackets and pins not only increases the number of parts but also complicates maintenance.

SUMMARY OF THE INVENTION

Accordingly, it is an objective of the present invention to provide a cylinder structure that facilitates the connection of the cylinder to the body frame.

Another objective of the present invention is to provide a cylinder supporting structure that is not affected by dimensional differences of different parts.

It is also a further objective of the present invention to provide a cylinder supporting structure that facilitates maintenance.

To achieve the above objectives, the present invention provides a hydraulic resistance device for resisting the movement of an axle of an industrial vehicle with respect to a frame of the industrial vehicle. The device is connected to a hydraulic circuit for regulating the behavior of the device. The device includes a planar engagement surface located on one of the axle and the frame. A cylinder body is fixed to the other of the axle and the frame. A hydraulic chamber, which contains hydraulic fluid, is defined within the body. A piston is located in the chamber. A piston rod is connected to the piston. The piston rod protrudes from the body toward the engagement surface and has a follower at its distal end for engaging and following the engagement surface such that, when the industrial vehicle travels, at least at certain times according to the state of the hydraulic circuit, the follower is permitted to move along the engagement surface when the axle pivots with respect to the frame. Pivotal movement of the axle toward the frame causes the piston to apply pressure to the hydraulic fluid within the chamber.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 3($b$) is an enlarged partial perspective view showing a piston rod having a semi-cylindrical distal end in a further embodiment according to the present invention.

DETAILED DESCRIPTION OF THE PREFERRED EMBODIMENTS

A first embodiment according to the present invention will now be described with reference to FIGS. 1 to 2.

Figure 1:
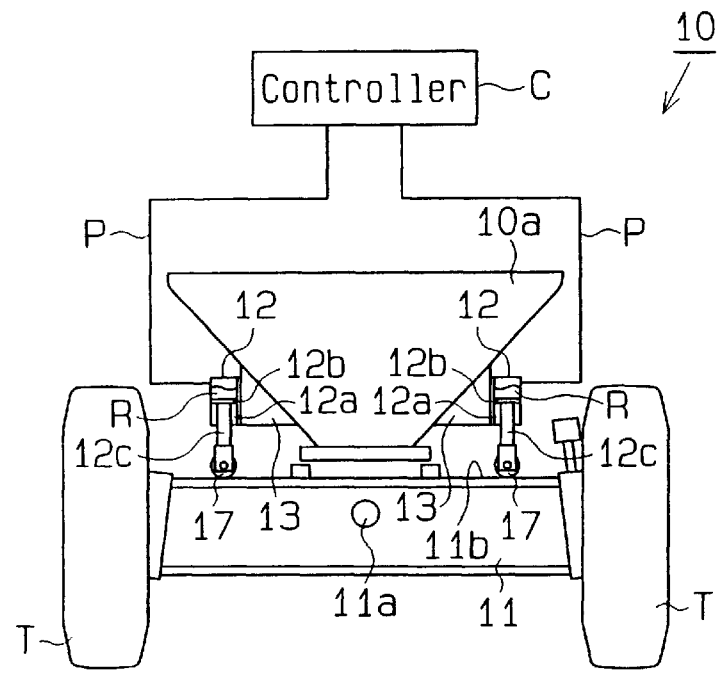
FIG. 1 is a diagrammatic drawing showing a mechanism for locking a rear axle of a forklift in a first embodiment according to the present invention.
Figure 2:
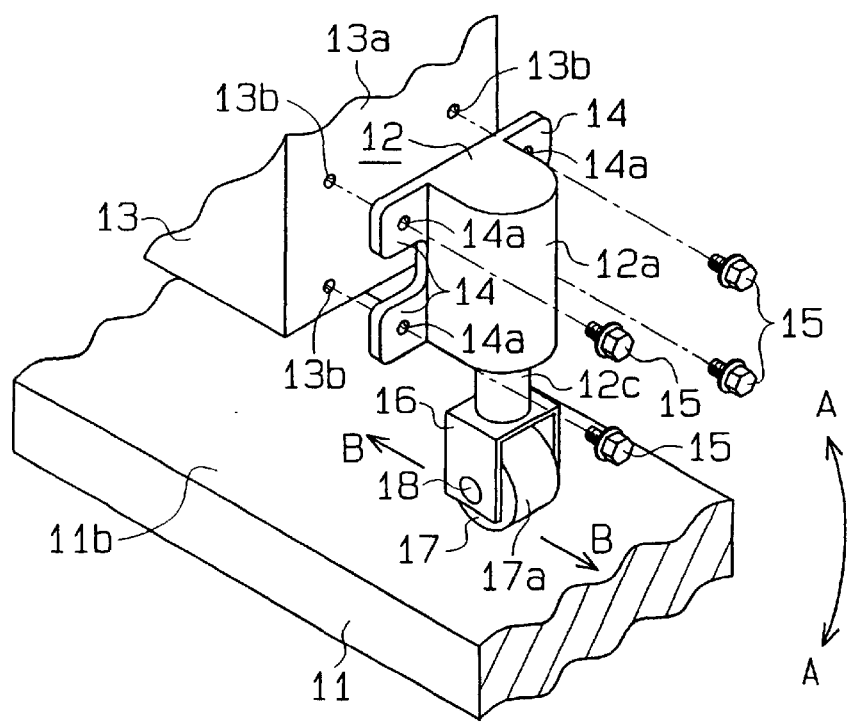
FIG. 2 is a schematic partial perspective view showing the structure for supporting a cylinder.

A structure for mounting rear wheels T on a forklift 10 is shown in FIG. 1. The forklift 10 has a body frame 10$a$. The rear wheels T are mounted on each end of a rear axle 11, which is located at the rear section of the forklift 10. The rear axle 11 is pivotally supported about a center pin 11$a$. The pivoting of the rear axle 11 tilts the rear axle 11 relatively to the frame 10$a$.

The frame 10$a$ and the rear axle 11 are connected to each other by a pair of hydraulic cylinders 12 to resist the forces applied to the rear wheels T.

The cylinders 12 are single-movement hydraulic cylinders. Each cylinder 12 includes a tube 12$a$, a piston 12$b$ accommodated in the tube 12$a$, and a piston rod 12$c$ connected with the piston 12$b$.

A block 13 is arranged on each side of the frame 10$a$. As shown in FIG. 2, each block 13$a$ has a side wall 13$a$. There are four threaded holes 13$b$ defined in the side wall 13$a$.

Four tongue-like connecting plates 14 extend from the cylinder tube 12$a$. Each connecting plate 14 is formed to contact the side wall 13a. A bolt hole 14a extends through each connecting plate 14 and is aligned with one of the threaded holes 13b. A bolt (or screw) 15 is inserted through each bolt hole 14a and fastened to the associated threaded hole 13b to fix the cylinder tube 12a to the block 13.

As described above, each cylinder 12 is connected to the associated block 13 using only the bolts 15. This reduces the number of parts and facilitates the installation of the cylinder 12.

A bifurcated bracket 16 is provided at the distal end of each piston rod 12c. A shaft 28 rotatably supports a roller 17 in the bracket 16. As the rear axle 11 pivots (or tilts relatively to the frame 10a) in the directions indicated by arrows A, the roller 17 follows the rear axle 11 and rolls along, the upper surface 11b, or engagement surface of the rear axle 11 in the directions indicated by arrows B. The piston rod 12c is like a cam follower, and the upper surface 11b is like a cam. Each piston rod 12c projects from and retracts into the cylinder tube 12a as the roller 17 rolls along the upper surface 11b (as long as the cylinder is not locked).

Since the piston rod 12c need not be connected to the rear axle 11, the cylinder 12 may be easily installed between the frame 10a and the rear axle 11. Furthermore, dimensional differences of parts used to support each cylinder 12 in the rear axle 11 and the frame 10a do not affect installation of the cylinder 12.

Each roller 17 has a peripheral surface 17a that contacts the engagement surface, or upper surface 11b, of the rear axle 11 as the roller 17 follows the tilting of the rear axle 11. Accordingly, the friction produced between the peripheral surface of each roller 17 and the upper surface 11b of the rear axle 11 is relatively small.

Additionally, no significant noise is produced when the upper surface 11b of the rear axle 11 contacts the peripheral surface 17a of the roller 17. Furthermore, the cylindrical shape of the roller 17 provides a large area of contact between the roller peripheral surface 17a and the axle upper surface 11b. This improves the impact resistance of the roller 17 and the rear axle 11 at the location where they come into contact with each other.

Each cylinder 12 has a hydraulic pressure chamber R. The piston 12b draws oil into and discharges oil out of the pressure chamber R. The pressure chamber R of each cylinder 12 is connected to a controller C by a passage P. The controller C closes each passage P to lock the associated cylinder 12 and opens each passage P to unlock the associated cylinder 12. That is, the controller C locks or unlocks the cylinders 12 when necessary to enhance driving stability and improve riding comfort.

Figure 3A:
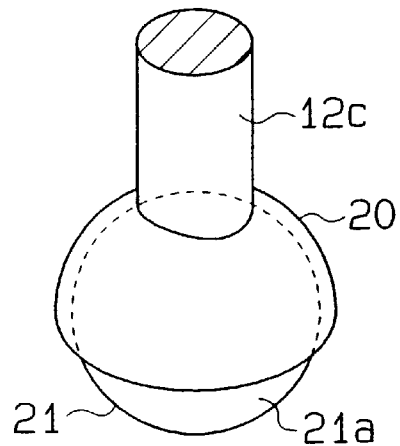
FIG. 3($a$) is an enlarged partial perspective view showing a piston rod having a round distal end in a further embodiment according to the present invention.
Figure 3B:
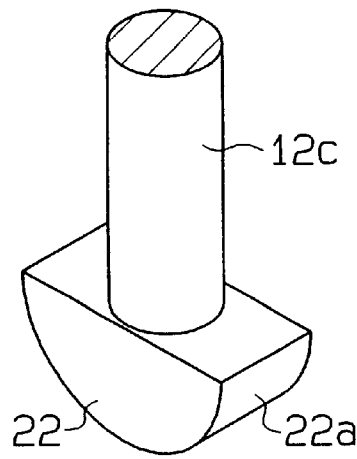

FIGS. 3(a) and 3(b) show the distal ends of piston rods 12c, which contact the upper surface 11b of the rear axle 11, employed in further embodiments according to the present invention.

In the cylinder 12 shown in FIG. 3(a), a ball 21 is rotatably held in a holder 20 located at the distal end of the piston rod 12c. The round surface 21a of the ball 21 contacts the upper surface 11b of the rear axle 11. The ball 21 can roll in any direction on the upper surface 11b of the rear axle 11. Therefore, if the rear axle 11 is tilted in a direction other than that indicated by arrows A in FIG. 2 according to the road conditions, the ball 21 can follow along the engagement surface 11b accordingly. That is, the ball 21 is not limited to movement along a single line of engagement.

In the cylinder 12 shown in FIG. 3(b), a semi-cylindrical piece 22 is provided at the distal end of the piston rod 12c. The semi-cylindrical surface 22a of the semi-cylindrical piece 22 contacts the upper surface 11b of the rear axle 11. The semi-cylindrical piece 22 is directly connected to the piston rod 12c. Thus, special parts for supporting the component that contacts the axle upper surface 11b are not necessary. This simplifies the structure for connecting the cylinder 12 to the rear axle 11.

Figure 4:
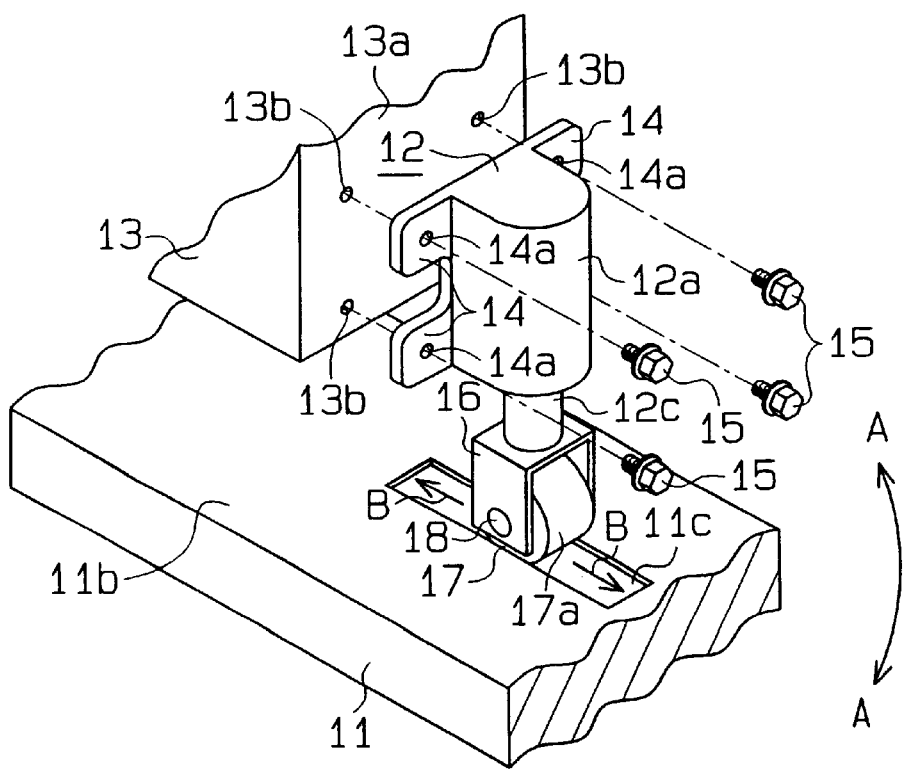
FIG. 4 is a schematic partial perspective view showing the connection of a cylinder in a further embodiment according to the present invention.

A further embodiment according to the present invention is shown in FIG. 4. This embodiment is a modification of the embodiment shown in FIGS. 1 and 2. In this embodiment, the upper surface 11a of the rear axle 11 includes a recessed engagement surface 11c for guiding the roller 17 in the directions indicated by arrows B. As the roller 17 follows the tilting of the rear axle 11, the roller 11 rolls in the recessed engagement surface 11c in the arrow B directions. This structure prevents unnecessary movement of the roller 17 and guarantees transmission of the tilting motion of the rear axle 11 to the cylinder 12.

It should be apparent to those skilled in the art that the present invention may be embodied in many other specific forms without departing from the spirit or scope of the invention. More specifically, the preferred embodiments may be modified as described below.

The location of each cylinder 12 with respect to the frame 10a may be changed arbitrarily. For example, a cylinder may be connected to the lower surface of the frame 10a rather than the side surface. In this case, the connecting plates 14 are arranged on the upper end of the cylinder tube 12a. Furthermore, it is possible to reverse the positions of the engagement surfaces and the cylinders such that the engagement surfaces are formed in the frame and the cylinders are fixed to the axle.

Therefore, the present examples and embodiments are to be considered as illustrative and not restrictive, and the invention is not to be limited to the details given herein, but may be modified within the scope and equivalence of the appended claims.

What is claimed is:

1. An industrial vehicle including a hydraulic resistance device for resisting the movement of an axle of the industrial vehicle with respect to a frame of the industrial vehicle, wherein the device is connected to a hydraulic circuit for regulating the behavior of the device, the industrial vehicle comprising:

a planar engagement surface located on one of the axle and the frame;

a cylinder body fixed to the other of the axle and the frame, wherein a hydraulic chamber, which contains hydraulic fluid, is defined within the body;

a piston located in the chamber;

a piston rod connected to the piston, wherein the piston rod protrudes from the body toward the engagement surface, wherein the piston rod rotatably supports a rotating member at its distal end for contacting and rolling on the engagement surface such that, when the industrial vehicle travels, at least at certain times according to the state of the hydraulic circuit, the rotating member is permitted to roll along the engagement surface when the axle pivots with respect to the frame, and wherein pivotal movement of the axle toward the frame causes the piston to apply pressure to the hydraulic fluid within the chamber.

2. The industrial vehicle of claim 1, wherein the cylinder body is fixed to the frame, and the engagement surface is an upper surface of the axle.

3. The industrial vehicle of claim 2, wherein the cylinder body is fixed to the frame with a plurality of bolts.

4. The industrial vehicle of claim 1, wherein the rotating member is a roller, wherein the roller has a rotational axis extending parallel to the pivot axis of the axle.

5. The industrial vehicle of claim 1, wherein the rotating member is a ball that rolls in any direction on the engagement surface.

6. The industrial vehicle of claim 1, wherein the engagement surface lies within a guide recess for guiding the rotating member.

7. The industrial vehicle of claim 1, wherein the cylinder body and the piston form a first resistance cylinder, and wherein the device includes a second resistance cylinder identical to the first resistance cylinder located on an opposite side of the vehicle from the first resistance cylinder, and wherein the engagement surface is a first engagement surface, and wherein the device includes a second engagement surface located on an opposite side of the vehicle from the first engagement surface in correspondence with the second resistance cylinder such that tilting of the axle in one direction causes the piston of the first resistance cylinder to apply pressure to the fluid within its hydraulic chamber and titling of the axle in the opposite direction causes the piston of the second resistance cylinder to apply pressure to the fluid within its hydraulic chamber.

8. The industrial vehicle according to claim 1, wherein the hydraulic circuit includes a controller for locking the cylinder at certain times such that fluid cannot exit the chamber so the axle cannot pivot with respect to the frame.

9. An industrial vehicle including a hydraulic cylinder device for resisting pivotal movement of an axle of the industrial vehicle with respect to a frame of the industrial vehicle, wherein the cylinder device is connected to a hydraulic circuit for regulating the behavior of the cylinder device, the industrial vehicle comprising:

first and second planar engagement surfaces, both engagement surfaces being located on one of the axle and the frame, wherein each engagement surface is located at a position that is on an opposite side of the vehicle from the other engagement surface;

first and second cylinder bodies, wherein a hydraulic chamber, which contains hydraulic fluid, is defined within each body, and wherein both bodies are fixed to the other of the axle and the frame, wherein each cylinder body is located at a position that is on an opposite side of the vehicle from the other cylinder body in correspondence with the engagement surfaces;

first and second pistons, wherein one of the pistons is located in each chamber;

first and second piston rods, one of the piston rods being connected to each piston, wherein each piston rod protrudes from the corresponding cylinder body toward the corresponding engagement surface, wherein each piston rod rotatably supports a roller at its distal end for contacting and rolling on the corresponding engagement surface, wherein each roller has a rotational axis extending parallel to the pivot axis of the axle, wherein at least certain times according to the state of the hydraulic circuit, when the industrial vehicle travels and the axle pivots with respect to the frame, each roller is permitted to roll along the corresponding engagement surface, and wherein pivotal movement of the axle in one direction causes one of the pistons to retract and apply pressure to the fluid within its hydraulic chamber as it rolls along its corresponding engagement surface.

10. The industrial vehicle of claim 9, wherein the cylinder bodies are fixed to the frame, and the engagement surfaces are on an upper surface of the axle.

11. The industrial vehicle of claim 10, wherein the cylinder body is fixed to the frame with a plurality of bolts.

12. The industrial vehicle of claim 9, wherein each roller has a cylindrical surface contacting the corresponding engagement surface.

13. The industrial vehicle of claim 9, wherein each engagement surface lies within a guide recess for guiding the corresponding roller, wherein the guide recess extends in a direction that is perpendicular to the pivot axis of the axle.

14. The industrial vehicle according to claim 9, wherein the hydraulic circuit includes a controller for locking the cylinders at certain times such that fluid cannot exit the chambers so the axle cannot pivot with respect to the frame.

15. An industrial vehicle including a hydraulic cylinder device for resisting pivotal movement of an axle of the industrial vehicle with respect to a frame of the industrial vehicle, wherein the cylinder device is connected to a hydraulic circuit for regulating the behavior of the cylinder device, the industrial vehicle comprising:

a controller for regulating the state of the hydraulic circuit;

first and second planar engagement surfaces, both engagement surfaces being located on the axle, wherein each engagement surface is located at a position that is on an opposite side of the vehicle from the other engagement surface;

first and second cylinder bodies, wherein a hydraulic chamber, which contains hydraulic fluid, is defined within each body, and wherein both bodies are fixed to the frame, wherein each cylinder body is located at a position that is on an opposite side of the vehicle from the other cylinder body;

first and second pistons, wherein one of the pistons is located in each chamber;

first and second piston rods, one of the piston rods being connected to each piston, wherein each piston rod protrudes from the corresponding cylinder body toward the corresponding engagement surface, wherein each piston rod rotatably supports a roller at its distal end for contacting and rolling on the corresponding engagement surface, wherein each roller has a rotational axis extending parallel to the pivot axis of the axle, wherein at least at certain times according to the state of the controller, when the industrial vehicle travels and the axle pivots with respect to the frame, each follower is permitted to move along the corresponding engagement surface, and wherein pivotal movement of the axle in one direction causes one of the pistons to retract and apply pressure to the fluid within its hydraulic chamber as it moves along its corresponding engagement surface.

* * * * *